United States Patent [19]
Zboril

[11] 3,966,511
[45] June 29, 1976

[54] PROCESS FOR THE MANUFACTURE OF ANTI-ABRADANT ELEMENTS

[75] Inventor: Josef Zboril, Fislisbach, Switzerland

[73] Assignee: BBC Brown Boveri & Company Limited, Baden, Switzerland

[22] Filed: June 27, 1974

[21] Appl. No.: 483,812

[30] Foreign Application Priority Data
June 29, 1973 Switzerland............. 9488/73

[52] U.S. Cl................. 148/127; 148/13.2; 148/16; 148/16.5; 148/16.6; 148/20.3; 148/34; 148/130; 148/138
[51] Int. Cl.².......................................... C21D 5/00
[58] Field of Search.......... 148/127, 16.5, 16.6, 148/16, 19, 20.3, 13, 34, 138, 130, 13.2

[56] References Cited
UNITED STATES PATENTS
1,814,762  7/1931  Mochel ............................. 148/16.6
1,918,895  7/1933  Bersey et al. ..................... 148/16.6
3,827,920  8/1974  Shimoda et al. .................. 148/16.6

Primary Examiner—R. Dean
Attorney, Agent, or Firm—Oblon, Fisher, Spivak, McClelland & Maier

[57] ABSTRACT

A method for reducing abrasion between interacting moving parts which comprises applying an anti-abradant element between said moving parts which anti-bradant element will increase in dimensional proportions upon exposure to oxidation, sulphation, nitration, carbonation and/or heat annealing whereby as the anti-abradant element is abraded, said dimensional proportions are increased whereby the spacing between said moving parts is maintained relatively constant.

6 Claims, 4 Drawing Figures

PROCESS FOR THE MANUFACTURE OF ANTI-ABRADANT ELEMENTS

BACKGROUND OF THE INVENTION

1. Field of the Invention

The present invention relates to a process for the manufacture of anti-abradant elements for devices with two parts moving against one another, especially a rotating part and a stator, as well as an anti-abradant element manufactured according to this process.

2. Description of the Prior Art

The degree of effectiveness of turbines, compressors, pressure shaft equipment, etc. decreases with increasing play between rotor and stator. Hence, attempts are always made to reduce the clearance between the rotor on the one hand, and the stator on the other, to the minimum. Optimum play is determined by material characteristics, manufacturing technology, and the size of the rotor and the stator as well as operating conditions to which the machine is subjected.

In order to keep the play between rotor and stator to a minimum, it has been suggested to equip the rotor vanes with a sharpened edge at the head. Thus, as the vanes touch the stator, the sharpened vane edges are bent or worn down so that harmful abrasion does not occur.

Further, in order minimum, reduce the play between rotor and stator to a ninimum, it has been suggested to cover the inside stator walls with a relatively soft layer which can be worn down, gradually, by the touching rotor vanes. Such layers consist of, for example, graphite, die-cast or sintered porous nickel-chromium alloys or nickel-chromium materials, honeycomb cells etc.; they are referred to as anti-abradants subject to abrading. In each case the aim was to make these anti-abradant layers as constant as possible with regard to shape so that no growth manifestations occur because of environmental temperature and/or environmental atmosphere.

These processes are deficient because the soft layers or the sharpened vane edges are subjected to an irreversible change in shape as the result of abrasion in that they are either bent or worn down. Additional factors are corrosion and erosion of the vane edges or the cell wall edges and the stator wall so that during continuous operation the play between rotor and stator increases steadily and the degree of effectiveness of the machine decreases.

SUMMARY OF THE INVENTION

It is one object of this invention therefore to provide anti-abradant elements which will lessen the play during operations resulting from abrasion, erosion or corrosion, in such a manner that the desired balance between play-increasing abrasion and play-reduction is maintained evenly during maximum continuous operation periods.

This and other objects of this invention as will hereinafter become more readily apparent have been attained by providing anti-abradant elements which are manufactured from a material that grows in an oxidizing, nitrating, sulphating and/or carbonizing atmosphere and/or when under the influence of heat; and that, prior to use, they are subjected to a treatment under the stated conditions and, if necessary, subjected to a concluding special treatment.

BRIEF DESCRIPTION OF THE DRAWINGS

Further features and advantages of this invention will become apparent from the following description of the embodiment in which.

DETAILED DESCRIPTION OF THE PREFERRED EMBODIMENTS

Figure 3:
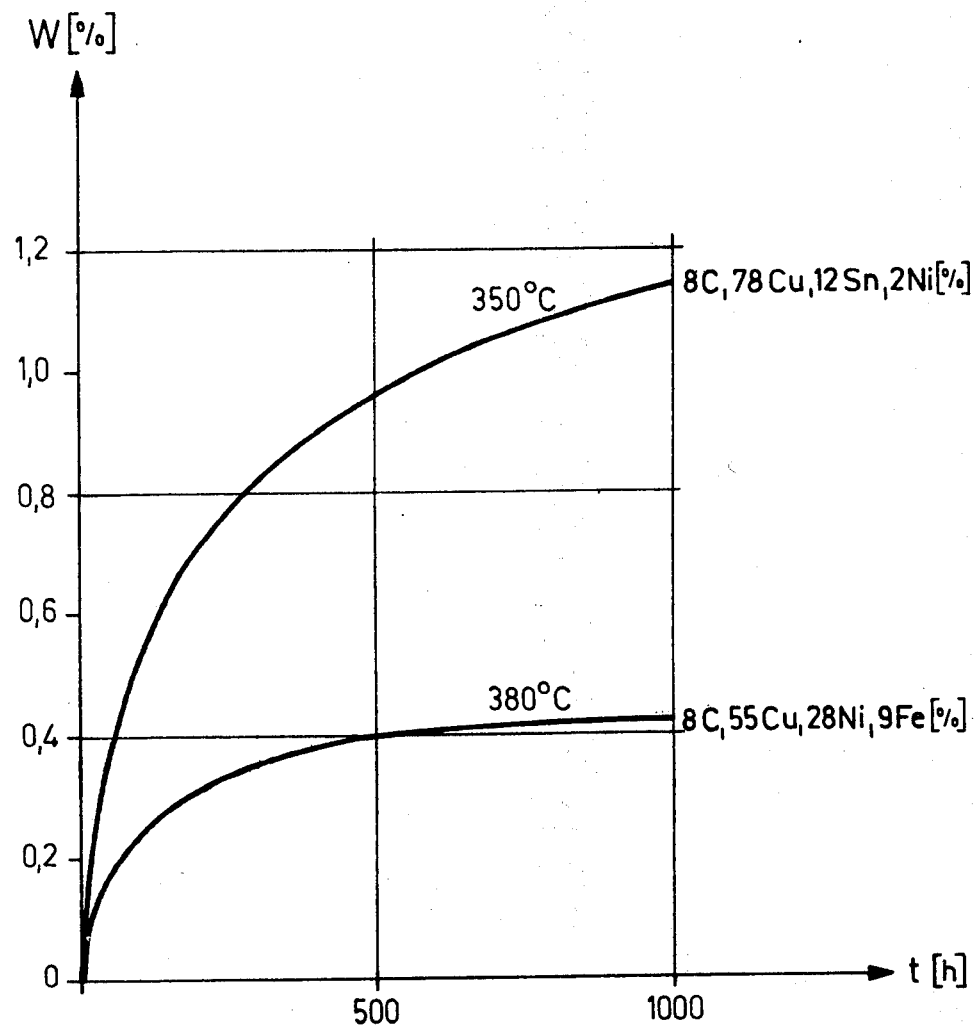
FIG. 3 is two growth curves of two graphite-metallic sinter materials, with the percentage of growth in length (W) over annealing time ($t$) in hours ($h$), for which composition of materials by elements is stated in percent of weight.

It has now been discovered that an effective anti-abradant can be prepared which utilizes a material which will "grow" or increase in dimensions, when exposed to certain conditions. Suitable such materials include gray cast iron, malleable cast iron, cast iron having a portion of globular and a portion of lamellar graphite and, sintered graphite-metal alloys containing Ni, Cu, Fe, Sn, Pb, Sb and/or Zn. When the element is formed of cast iron, the alloy may be a eutectic alloy, near eutectic or overeutectic alloy. These materials can be made to grow as above-defined, by exposure to conditions which will alter their chemical composition so as to form a new material of a larger specific volume. Since this process can be made to occur over an extended time period, the dimensions of the anti-abrasion material will appear to grow. This "growth" can be stimulated by exposure of the work piece to oxidation, nitration, carbonization, sulphation, and/or by application of heat. For instance, oxidation of Cu or Ti in air will cause a growth pattern as indicated in FIG. 3.

In some instances, growth of the material will be due to structural changes in the metallic part, such as annealing treatment of high carbon content steels which result in effecting a phase change to a steel phase having a larger specific volume.

Good results are obtained when the element is annealed to at least 250°C prior to use, or preferably from 600°–700°C prior to use.

This solution is based on the fact that the growth of the named materials under constant conditions always follows a curve which initially rises steeply and then progressively less steeply during which process the curvature of this curve, i.e., the deviation from a linear course corresponding to the desired constant growth, becomes less pronounced with progressive growth. Hence, during the initial use of the anti-abradant or growth elements, an actually excessive growth rate with corresponding risk resulting from excessive pressure between the parts moving against one another would have to be accepted, in order to attain the later, more favorable growth rate which is more suitable for continuous operation. Conversely, the growth rate during continuous operation would decrease to an undesirable extent if it had been adjusted to optimum values during the initial phase. Here, with respect to the effect within the machine, the absolute growth rate in a length/time dimension is significant; it is adjustable by determining the thickness of the anti-abradant elements, beyond that it is in each case proportional to the relative growth rate in %/time with its saturation curve dependent upon the material used. Accordingly, the invented process permits the predetermination of the absolute growth rate for a desired continuous operations value, based upon the known relative growth curve of the material in use, and the pre-application of the resultant higher and drastically changing initial growth rate in a pre-aging process, preferably under forced growth conditions.

The invention will now be explained in greater detail by reference to the aforementioned figures.

Figure 1:
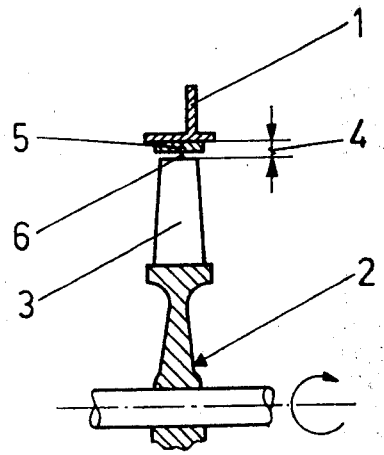
FIG. 1 is a portion of a longitudinal cross-section of a turbine, with the first example of the use of an anti-abradant element.

FIG. 1 shows a portion of an axial section of a compressor, consisting of a stator 1 and a rotor 2 which is equipped with peripheric rotor vanes 3. Stator 1 and rotor 2 consist of a volume-constant material, e.g., steel. In order to keep the distance 4 between the edges of rotor vanes 3 and stator 1 as short as possible, a ring 5, consisting of segments and made of a growing material, preferably gray cast iron, has been affixed mechanically on the inner surface of stator 1 and opposite the rotor vanes' edges. As the rotor vanes' edges rub against ring 5 they are, insofar as they have been sharpened, bent; or the segments, insofar as they are soft, are worn off on the side of the rotor. As a result of, on the one hand, the oxidizing operational atmosphere and, on the other, the operational temperature, the ring segments 5 grow, also in the direction toward the rotor axis. Thus the play 6 resulting from the abrasion and the effects of corrosion-erosion is reduced. In this manner corrosion and erosion loss as well as loss from unforeseeable vibrations and temperature increases are eliminated.

Figure 2:
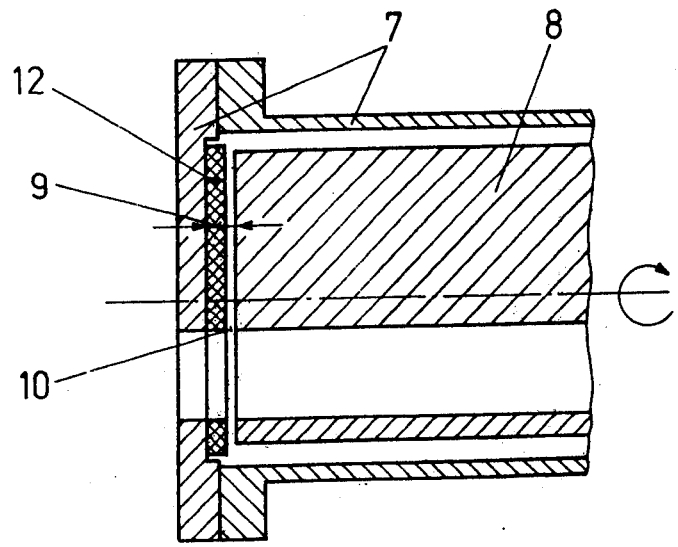
FIG. 2 is a portion of a longitudinal cross-section of a pressure shaft machine, with a second example of the use of an anti-abradant element.

FIG. 2 shows a cross-section of a pressure shaft machine with a stator 7 made of nodular cast iron and a rotor 8 made of Ni-alloy. For such machines the frontal distance 9 or the play between rotor 8 and stator 7 must be kept to a very minimum. For this purpose a plate 12 made of a growing substance, preferably soft gray cast iron, is cast within stator 7. Here too, plate 12 grows, owing to the oxidizing operations atmosphere on the one hand, and the operations temperature, on the other.

In contrast to the example of use in FIG. 2, plate 12 may, for example, be firmly affixed to the frontal side of the rotor 8 so that it grows in rotor axis direction toward the stator 7. Basically, one has the option of attaching the growing element either on the rotor and/or on the stator. Since rotor parts generally are subjected to severe mechanical stresses, it seems prudent to affix growing elements only to the stator parts.

Figure 4:
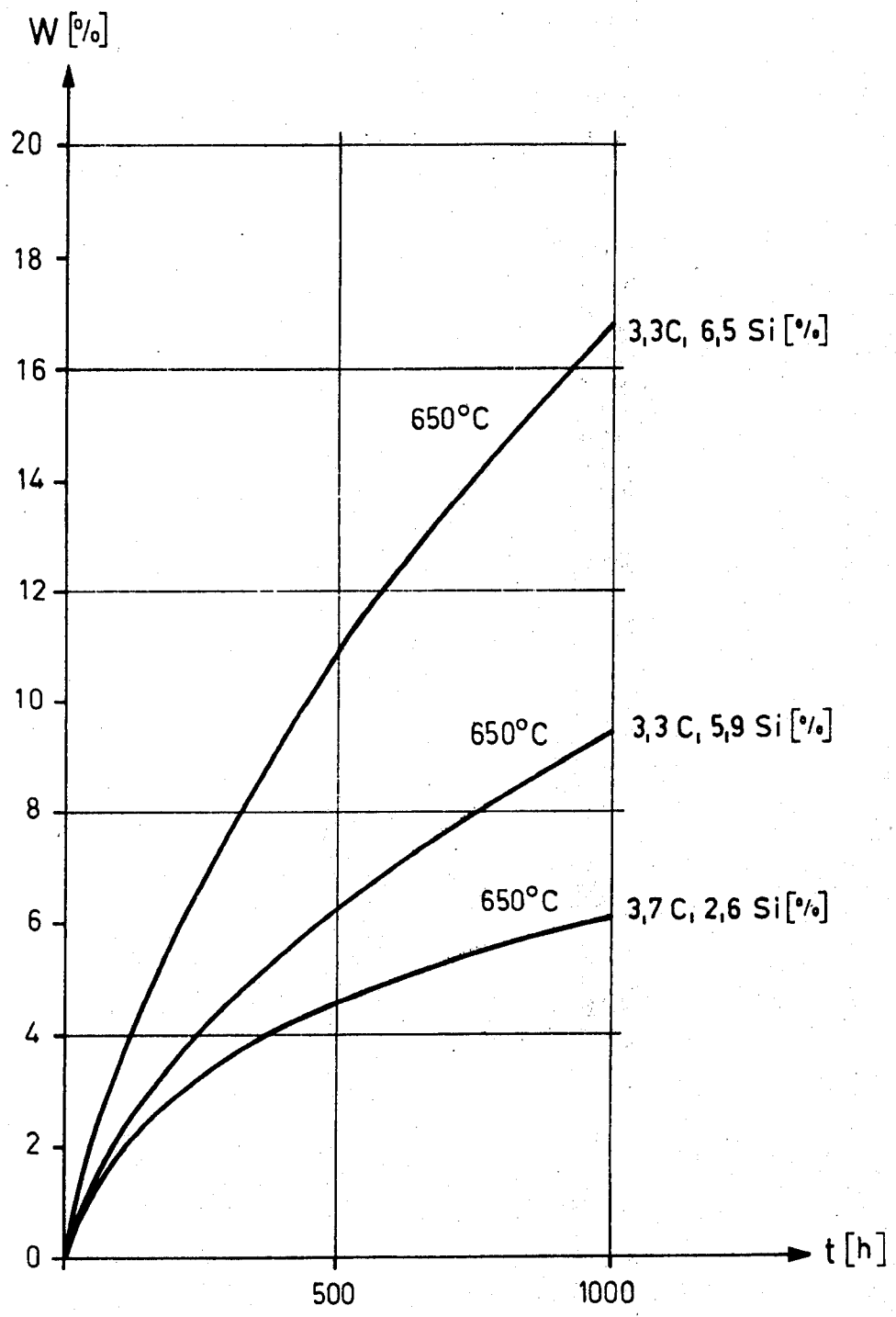
FIG. 4 corresponds to growth curves of three gray cast iron types, for which the principal added elements are stated in percent of weight.

The growth loss of three different types of gray cast iron during annealing at 650°C air temperatures is depicted in FIG. 4. The growth of the gray cast iron used for manufacturing plate 12 or segmentized ring 5, hereinafter referred to as element, can be varied within wide limits, e.g., by selecting its composition, by changing the cooling speed when casting the element, by heat treatment of the element following the casting etc. Further, the growth of an element made of gray cast iron is dependent upon its shape, the means of attachment to the basic material, stress, operational temperature, and operational atmosphere. In any event, the growth rate curve reflects the suggested course with decreasing curvature, i.e., with increasing approximation toward a linear course with nearly constant growth rate.

The elements are attached to the basic material of the stator or the rotor by conventional means as, for example, mechanically, by soldering, by welding, casting, sintering, etc.

As can be seen in FIGS. 3 and 4, the growth curves reflect greater growth per unit of time during the initial annealing than is true after extended annealing periods. Further, increased growth occurs with increasing annealing temperatures. In order to obtain at least a near constant growth rate of elements in actual operations, it is intended to exploit only that growth range which is characterized by a near constant growth rate and which, in FIGS. 3 and 4, corresponds to that part of the curve which extends from an annealing period of circa 250 hours to an annealing period of circa 1,000 hours. In each case, depending upon the material used, annealing temperature and annealing time must be attuned to each other in such manner that the growth rate is near constant toward the end of the heat treatment or at least reflects a lesser change than was evident during the initial phase. If cast iron is used for the manufacture of elements, annealing temperatures of at least 500°C are appropriate in order to economize by shortening the pre-aging. When using a material with a copper basis, as shown in FIG. 3, the use of annealing temperatures of at least 250°C is suitable. A further reduction of time needed for the pre-aging may be achieved by using a suitable aggressive atmosphere whose composition may, if necessary, differ from that of operating conditions in the direction of a forced growth rate.

Having now fully described the invention, it will be apparent to one of ordinary skill in the art that many changes and modifications can be made thereto without departing from the spirit or socpe of the invention as set forth herein. What is claimed as new and intended to be covered by letters patent is:

1. A method for reducing abrasion between interacting moving parts, which comprises:
    fixedly attaching an anti-abradant element of gray cast iron onto the surface of a moving part such that it is positioned between said moving parts;
    pre-annealing said anti-abradant element attached to said moving part at a temperature of at least 250°C; and
    allowing the dimensional proportions of said anti-abradant element to increase upon exposure to oxidation, sulfation, nitration, carbonization, heat annealing, or combinations thereof as said anti-abradant element is abraded, whereby the spacing between said moving parts is maintained relatively constant.

2. The method of claim 1, wherein said moving parts comprise a coacting rotating part and a stator part.

3. The method of claim 1, wherein said anti-abradant elements are manufactured by melting-metallurgical processes or powder-metallurgical processes.

4. The method of claim 1, wherein said anti-abradant elements are manufactured from near or over-eutectic gray cast iron.

5. The method of claim 4, wherein said anti-abradant element is annealed at least 500°C prior to use.

6. The method of claim 5, wherein said anti-abradant element is annealed at 600° to 700°C prior to use.

* * * * *